(12) United States Patent
Kalis et al.

(10) Patent No.: US 7,475,858 B2
(45) Date of Patent: *Jan. 13, 2009

(54) SEPARABLE BALL AND SOCKET ASSEMBLY FOR ELECTRONIC DEVICE MOUNTS

(75) Inventors: Robert M. Kalis, Overland Park, KS (US); Stephen P. Waite, Blue Springs, MO (US); Paul E. Skelton, Lenexa, KS (US); Dale R. Langner, Louisburg, KS (US)

(73) Assignee: Garmin Ltd. (KY)

(*) Notice: Subject to any disclaimer, the term of this patent is extended or adjusted under 35 U.S.C. 154(b) by 0 days.

This patent is subject to a terminal disclaimer.

(21) Appl. No.: 11/868,571

(22) Filed: Oct. 8, 2007

(65) Prior Publication Data

US 2008/0023606 A1  Jan. 31, 2008

Related U.S. Application Data

(63) Continuation of application No. 11/304,836, filed on Dec. 15, 2005, now Pat. No. 7,296,771, which is a continuation-in-part of application No. 11/181,261, filed on Jul. 14, 2005, now Pat. No. 7,219,867.

(51) Int. Cl.
*A47F 5/00* (2006.01)

(52) U.S. Cl. ............... 248/288.31; 248/205.5; 248/205.9; 403/133; 403/135

(58) Field of Classification Search ............ 248/288.31, 248/205.5, 206.2, 205.7, 205.8, 205.9, 205.6, 248/481, 483, 484, 685, 181.1, 917, 919, 248/920, 921, 922; 403/133, 135, 144

See application file for complete search history.

(56) References Cited

U.S. PATENT DOCUMENTS

| 1,186,428 | A | | 6/1916 | Newman |
| 1,877,570 | A | | 9/1932 | Fitz Gerald |
| 3,176,602 | A | | 4/1965 | Wilt ........................ 248/205.5 |
| 4,813,640 | A | * | 3/1989 | Perentin .................. 248/205.8 |
| 4,894,754 | A | | 1/1990 | Levilain |
| 5,411,230 | A | | 5/1995 | Messinger |
| 5,615,857 | A | | 4/1997 | Hook |
| 5,799,914 | A | * | 9/1998 | Chivallier et al. ......... 248/176.1 |
| 5,845,885 | A | | 12/1998 | Carnevali ................. 248/181.1 |

(Continued)

FOREIGN PATENT DOCUMENTS

DE  19638388 A1  4/1998

(Continued)

*Primary Examiner*—Ramon O Ramirez
(74) *Attorney, Agent, or Firm*—Samuel M. Korte (57) ABSTRACT

Embodiments of the present invention provide a mounting assembly for mounting an electronic device to a surface. The mounting assembly generally includes a base including a mounting ball and a socket assembly operable to frictionally engage the ball to removably couple the socket assembly to the base. The base may be removably coupled with the surface and the socket assembly may be removably coupled with the electronic device. Such a configuration enables the electronic device to be easily positioned in confined environments by first attaching the base to the surface, then attaching the socket assembly to the base and positioning the socket assembly in a desired orientation, and finally attaching the electronic device to the socket assembly.

13 Claims, 5 Drawing Sheets

U.S. PATENT DOCUMENTS

| | | | |
|---|---|---|---|
| 5,988,572 A | 11/1999 | Chivallier et al. | 248/176.1 |
| 6,095,470 A | 8/2000 | Kalis | 248/309.1 |
| 6,129,321 A | 10/2000 | Minelli et al. | 248/183.1 |
| 6,173,933 B1 | 1/2001 | Whiteside et al. | 248/276.1 |
| 6,352,227 B1 | 3/2002 | Hathaway | |
| 6,371,345 B1 | 4/2002 | Leyden et al. | |
| 6,418,010 B1 | 7/2002 | Sawyer | |
| 6,427,959 B1 | 8/2002 | Kalis et al. | 248/288.11 |
| 6,439,530 B1 | 8/2002 | Schoenfish et al. | 248/346.06 |
| 6,464,185 B1 | 10/2002 | Minelli et al. | 248/183.1 |
| 6,502,794 B1 | 1/2003 | Ting | 248/206.2 |
| 6,529,381 B1 | 3/2003 | Schoenfish | 361/725 |
| 6,663,064 B1 | 12/2003 | Minelli et al. | 248/205.5 |
| 6,672,788 B2 | 1/2004 | Hathaway | 403/90 |
| 6,690,268 B2 | 2/2004 | Schofield et al. | |
| 6,802,275 B2 | 10/2004 | Schmidt | |
| 6,902,345 B2 | 6/2005 | Kur | 403/135 |
| 6,913,232 B2 | 7/2005 | Richter | |
| 6,915,996 B2 | 7/2005 | Lin | 248/288.51 |
| 6,973,377 B2 | 12/2005 | Majstorovic et al. | |
| 7,066,434 B2 * | 6/2006 | Kwok | 248/205.8 |
| 7,219,867 B2 | 5/2007 | Kalis et al. | 248/288.31 |
| 7,296,771 B2 * | 11/2007 | Kalis et al. | 248/288.31 |
| 2003/0168572 A1 | 9/2003 | Scheuble et al. | 248/481 |
| 2004/0093129 A1 | 5/2004 | Majstorovic et al. | |
| 2005/0006575 A1 | 1/2005 | Heslin et al. | |
| 2005/0127261 A1 | 6/2005 | Lin | 248/288.51 |
| 2006/0076463 A1 | 4/2006 | Drew | 248/121 |
| 2006/0177262 A1 | 8/2006 | Richter | |

FOREIGN PATENT DOCUMENTS

| | | |
|---|---|---|
| DE | 1995786 | 10/2004 |
| FR | 1251433 A | 1/1964 |
| SU | 1791209 | 4/1965 |
| WO | WO 0065308 A1 | 11/2000 |

* cited by examiner

SEPARABLE BALL AND SOCKET ASSEMBLY FOR ELECTRONIC DEVICE MOUNTS

CROSS-REFERENCE TO RELATED APPLICATIONS

The present application is a continuation of U.S. patent application Ser. No. 11/304,836, filed Dec. 15, 2005, now U.S. Pat. No. 7,296,711, which is a continuation-in-part U.S. patent application Ser. No. 11/181,261, filed Jul. 14, 2005, now U.S. Pat. No. 7,219,867. U.S. patent application Ser. Nos. 11/304,836 and 11/181,261 are herein incorporated by reference in their entirety.

BACKGROUND OF THE INVENTION

The present invention relates to the field of mounting assemblies for electronic devices. More particularly, the invention relates to a mounting assembly with a ball and socket joint, wherein the ball and socket are easily separable for quick installation and removal of an electronic device.

The use of electronic devices in vehicles has increased in recent years. For example, it is increasingly more common to see electronic devices such as global positioning satellite (GPS) devices, portable telephones, radios and personal digital assistants (PDAs) mounted within vehicles either permanently or, in the case of portable electronics, removably. Many of these devices have displays which visibly communicate information to one or more users. Thus, it is advantageous to be able to adjust a position and angle of such devices to provide maximum viewing capability to the user or users. Portable devices are further advantageous in that they can be taken from the vehicle and used outside of the vehicle.

Due to the wide variety of electronic devices that can be mounted within a vehicle, many different types of mounting apparatuses exist that can secure an electronic device to the dashboard, windshield, floor, or other support surface in a vehicle such that a user may adjust a position of the device. One type of mounting apparatus used with portable electronic devices includes a base connected to a cradle via a ball and socket joint. The base is fixedly or permanently secured to a surface of the vehicle, and the ball and socket joint allows the cradle to be selectively positioned in any of a broad range of positions relative to the base. The cradle receives an electronic device and retains the electronic device with screws or similar fastening devices, allowing a user to selectively adjust a position or orientation of the electronic device.

While this type of prior art mounting apparatus is operable to mount a portable electronic device to a vehicle so that the device can be repositioned, it suffers from certain limitations. The cradles of prior mount apparatuses increase the size, weight, and cost of the apparatus, for example, and require a user to loosen or tighten the screws or other fasteners each time the electronic devices are mounted to or removed from the cradles, and loosen and subsequently tighten the screws each time it is desired to re-position the electronic devices.

Accordingly, there is a need for an improved vehicle mounting apparatus for a portable electronic device that does not suffer from the problems and limitations of the prior art.

SUMMARY OF THE INVENTION

The present invention solves the above-described problems and provides a distinct advance in the art of vehicle mounting assemblies for electronic devices. More particularly, the present invention involves a mounting assembly with a separable ball and socket joint that eliminates the need for a cradle interposed between a mount and an electronic device.

According to a first embodiment, the invention comprises a mount that may be secured to a surface of a vehicle, a mounting ball projecting from the mount, and a housing for encasing an electronic device. The housing includes a socket assembly for receiving and frictionally engaging the ball to retain the housing in a fixed position relative to the mount.

According to a second embodiment of the invention, the socket assembly comprises an orifice formed in the back of the housing, a seat positioned in the orifice for matingly receiving the ball, and a spring element partially surrounding the seat. The seat includes a concave portion and flexible, interconnected arms extending from the concave portion for contacting an outer surface of the ball and frictionally resisting rotation of the ball relative to the orifice. The spring element substantially encircles the flexible arms to allow the flexible arms to flex outward when receiving the ball and to then contract inwardly to firmly hold the ball when the ball is seated fully in the seat.

A third embodiment of the invention involves an assembly for removably mounting an electronic device to a vehicle. The assembly comprises a suction-cup mount removably attachable to a surface of the vehicle, a mounting ball projecting from the mount, an electronic device with a housing for encasing the electronic device, and a socket assembly integrally formed in the housing. The socket assembly includes an orifice formed in the back of the housing, a seat positioned in the orifice for matingly receiving the ball, and a spring element partially surrounding the seat. The seat further includes a concave center portion and a plurality of flexible, interconnected arms extending from the concave portion. The arms form a cage smaller in diameter than the ball when the arms are in a relaxed state and are curved to substantially conform to the outer surface of the ball and to engage a hemisphere of the ball distal the concave center portion to retain the ball in the seat. The spring element includes a metal spring ring substantially encircling the arms, wherein the spring ring allows the arms to flex outward when receiving and releasing the ball, and to contract inwardly to contact the ball when the ball is seated fully in the seat.

In another embodiment, the present invention provides a mounting assembly for mounting an electronic device to a surface. The mounting assembly generally includes a base including a mounting ball and a socket assembly operable to frictionally engage the ball to removably couple the socket assembly to the base. The base may be removably coupled with the surface and the socket assembly may be removably coupled with the electronic device.

In another embodiment, the mounting assembly includes a base and a socket assembly operable to removably couple with the base and an electronic device. The base includes a circular platform to removably couple with the surface, an arm extending from the platform, and a mounting ball positioned on a distal end of the arm. The socket assembly includes a seat having a plurality of curved arms that are operable to receive and frictionally engage the ball to removably and rotatably couple the socket assembly to the base.

In another embodiment, the mounting assembly includes a base and a socket assembly operable to removably couple with the base and an electronic device. The base includes a circular platform to removably mount to the surface utilizing suction, a lever coupled with the platform, an arm extending from the platform and operable to rotate with respect to the platform, and a mounting ball positioned on a distal end of the arm. The socket assembly includes an arcuate clip operable to removably couple with the electronic device and a seat coupled with the clip. The seat has a plurality of curved and interconnected arms that substantially conform to an outer surface of the ball. The arms are operable to contact the outer surface of the ball to receive the ball to removably and rotatably couple the socket assembly to the base and to frictionally resist rotation of the ball relative to the seat.

These and other features of the present invention are described more fully in the detailed description below.

BRIEF DESCRIPTION OF THE DRAWING FIGURES

A preferred embodiment of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

Figures 1, 2:
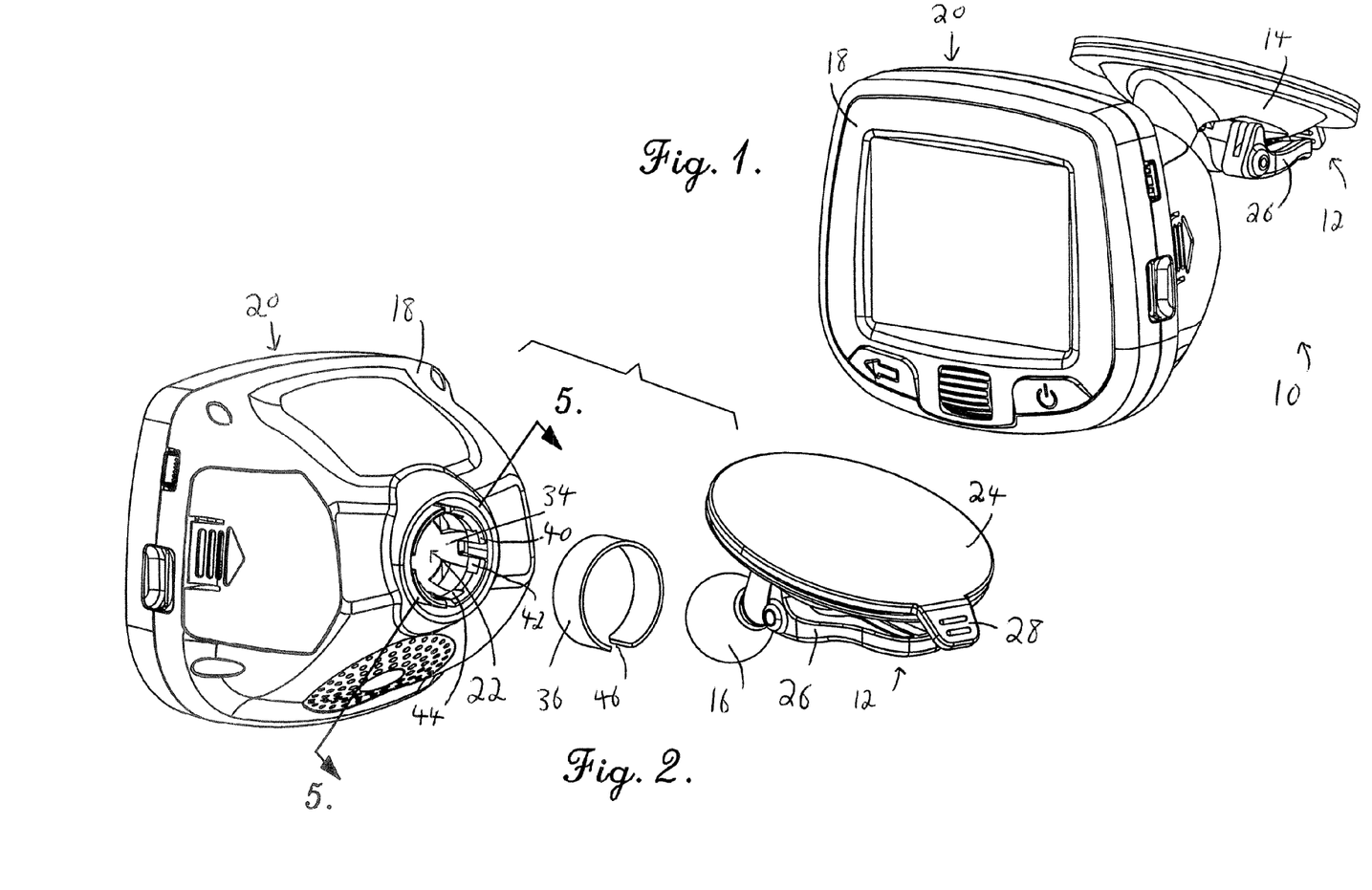
FIG. 1 is a perspective view of a mounting assembly for a portable electronic device constructed according to a preferred embodiment of the invention.
FIG. 2 is an exploded rear perspective view of the mounting assembly of FIG. 1, illustrating a ball and socket joint that separably secures an electronic device to a mount.

Referring initially to FIGS. 1 and 2, an exemplary mounting assembly for electronic devices employing the principles of the present invention is shown and designated generally by the reference numeral 10. The mounting assembly 10 comprises a mount 12 including a base 14 and a mounting ball 16; and a housing 18 for a portable electronic device 20, wherein the housing 18 presents a socket assembly 22 for receiving the ball 16.

The mount 12 removably secures to a surface of a vehicle (see FIG. 3), such as a windshield of the vehicle, and supports the electronic device 20 in view of a user, such as a vehicle driver or passenger. The mount 12 includes a rigid circular base 14 that is generally convex so as to curve away from the vehicle surface. A flexible sheet 24 is positioned between the base 14 and the vehicle surface for engaging the vehicle surface with a vacuum grip, wherein an air-tight seal is created between the flexible sheet 24 and the vehicle surface. The mount 12 can also be replaced with a mount that is more permanently applied to the windshield or other surface with adhesives, a mount with a weighted base that rests on a vehicle dashboard, or any other type of mounting device.

A lever 26 is positioned generally in a center of the base 14 and connects to a center of the flexible sheet 24 through the base 14 and enables the user to actuate the flexible sheet 24 to create the vacuum gripping function. A tab 28 of the flexible sheet 24 extends beyond a rim of the base 14 and enables a user to release the mount 12 by breaking the air-tight seal between the flexible sheet 24 and the vehicle surface. The vacuum grip or "suction cup" function of the mount 12 is substantially conventional in nature and therefore will not be described in greater detail here.

Figures 3, 4, 5, 6:
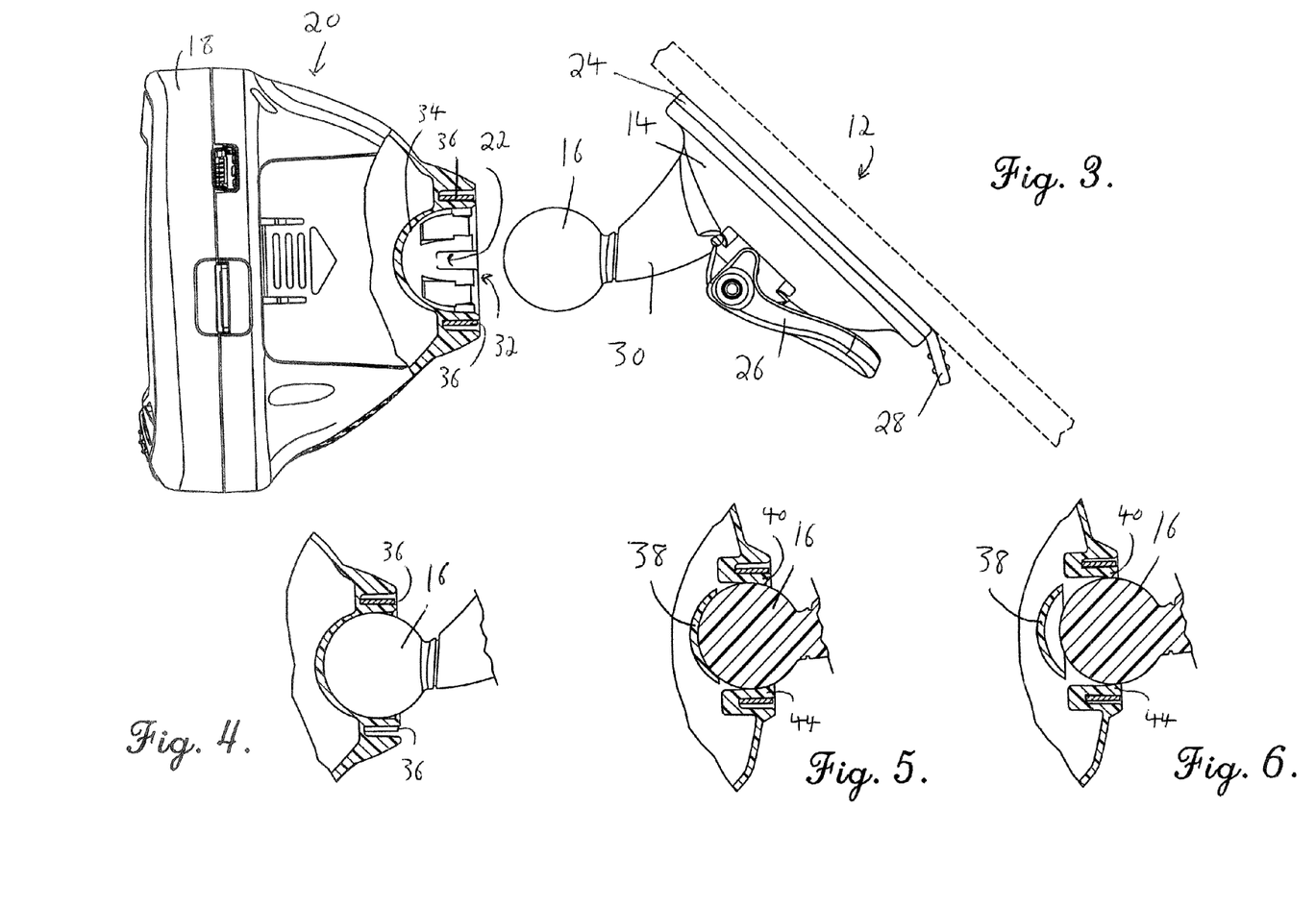
FIG. 3 is a side elevation view of the mounting assembly of FIG. 1, wherein the ball is illustrated separated from the socket.
FIG. 4 is a fragmentary view of the ball and socket of the mounting assembly of FIG. 1, wherein the ball is snapped into the socket.
FIG. 5 is a fragmentary view of the ball and socket of the mounting assembly of FIG. 1 taken along line 5-5 of FIG. 2, wherein the ball is snapped into the socket.
FIG. 6 is a fragmentary view of the ball and socket of the mounting assembly of FIG. 1, wherein a plurality of plastic arms of the socket are flexed outward to allow the ball to pass into the socket.

Referring also to FIG. 3, the ball 16 is connected to the base 14 via a neck 30 projecting from the base 14. The neck 30 is eccentrically located on the base 14 and projects substantially normally therefrom, but projects slightly away from a center of the base 14. The ball 16 is connected to the neck 30 such that a center of the ball 16 is proximate a line extending normally from an edge of the base 14 and is spaced approximately one and one-quarter inches from the base 14. The ball 16 is substantially rigid to prevent deformation thereof and presents an outer surface that introduces sufficient friction between the ball 16 and the socket assembly 22 to resist movement of the electronic device 20 relative to the mount 12. The ball 16 is thus constructed of plastic or another sturdy material that presents a rough surface, or is coated to present a rough or soft surface with the friction characteristics described above.

The electronic device 20 may be any portable electronic device to be removably mounted in a vehicle. The illustrated device 20 is a model i3 STREETPILOT™ GPS-based navigational device manufactured by GARMIN™. The housing 18 of the electronic device 20 encases the electronic device 20 and is substantially conventional, except that the housing 18 presents a socket assembly 22 for removably connecting directly to the ball 16 of the mount 12, wherein the socket assembly 22 frictionally engages the ball 16 to retain the housing 18 in a fixed position relative to the mount 12. The socket assembly 22 generally comprises an orifice 32 formed in the back of the housing 18, a seat 34 positioned in the orifice 32 for matingly receiving the ball 16, and a spring element 36 partially surrounding the seat 34.

The seat includes a concave center portion 38 and a plurality of flexible, interconnected arms. In one embodiment, four arms 40,42,44 (only three of which are visible in the drawing figures) are spaced at 90° intervals and extend from the concave center portion. However, any number of arms may be provided without departing from the scope of the present invention. The concave center portion 38 presents a continuous, bowl-shaped surface concave to the orifice 32 such that the center portion 38 matingly receives the ball 16. The center portion 38 is constructed of plastic or other material presenting a surface that introduces friction between the center portion 38 and the ball 16 to resist movement of the ball 16 relative to the orifice 32. Furthermore, the center portion 38 is in a fixed position relative to the housing 18 and is substantially rigid so as not to yield to pressure exerted by the ball 16.

The arms 40,42,44 are connected to and extend from a periphery of the center portion 38 and are curved to form a circular cage, wherein the center portion 38 and the arms 40,42,44 together define a generally spherical cavity for receiving and retaining the ball 16. The ball 16 and seat 34 are constructed such that the ball 16 snaps into and out of the spherical cavity defined by the seat 34. When the arms 40,42, 44 are in a relaxed or unflexed state, the inside of the cage formed by the arms 40,42,44 is slightly smaller in diameter than an external surface of the ball 16, such that when the ball 16 is inserted into the cage the arms 40,42,44 engage and press against the ball 16. In this manner, the arms 40,42,44 frictionally resist rotation of the ball 16 within the socket assembly 22 and require a user to manually push the electronic device 20 from a first position to a second position relative to the mount 12. FIGS. 4-5 illustrated the arms 40,42, 44 engaging the ball 16 when the ball 16 is seated in the socket assembly 22.

The arms 40,42,44 curve around the ball 16 from the periphery of the center portion 38 to a point that is on a hemisphere of the ball 16 opposite the center portion 38 to retain the ball 16 in the seat 32. In other words, the arms 40,42,44 "reach around" the ball 16 from the center portion 38 such that the opening of the cage is smaller than the diameter of the ball 16. This allows the ball 16 to be snapped into the socket assembly 22 by forcing the ball 16 into the socket assembly 22 and toward the center portion 38 of the seat 32, wherein the arms 40,42,44 flex outwardly to allow a girth of the ball 16 to pass through the opening of the cage and then contract inward when the ball 16 is fully seated in the socket assembly 22. Likewise, the arms 40,42,44 release the ball 16 by flexing outward when the ball 16 is forced away from the center portion 38 of the seat 34 and out of the socket assembly 22. FIG. 6 illustrates the arms 40,42,44 flexing outward to accommodate passage of the ball 16.

The spring element 36 partially encircles the arms 40,42,44 and is operable to bias the arms 40,42,44 inwardly to contact the ball 16 when the ball 16 is in the socket assembly 22, while allowing the arms 40,42,44 to flex outwardly to receive and release the ball 16. The illustrated spring element 36 is a metal spring ring that substantially encircles the arms 40,42,44, and is approximately one-quarter to one-half of an inch wide, approximately three-quarters of an inch in diameter, and presents a gap 46 of approximately one-eighth to one-quarter inch between ends thereof. The gap 46 allows the spring ring to flex. When the ball 16 is not in the socket assembly 22, the spring element 36 is relaxed and applies little or no biasing pressure on the arms 40,42,44. When the ball 16 is forced into the socket assembly 22, the arms 40,42,44 flex outwardly, as discussed above, and engage the spring element 36, causing the spring element 36 to also flex outwardly wherein the gap 46 widens. When the ball 16 is snapped into the seated position the spring element 36 biases the arms 40,42,44 inwardly against the ball 16.

Thus, the arms 40,42,44 and the spring element 36 cooperate to frictionally resist rotation of the ball 16 within the socket assembly 22 and to retain the ball 16 in the socket assembly 22. The cooperation between the arms 40,42,44 and spring element 36 presents a distinct advance in the art because, among other things, the combination is more effective in retaining the ball 16 within the socket assembly 22 than either component would be individually. The arms 40,42,44 alone, for example, typically would not provide as strong a spring force as the combination of the arms 40,42,44 and the spring element 36, and may permanently bend outward or even break after repeated use. Furthermore, the spring element 36 acting alone would provide less contact area with the ball 16, and metal would provide less friction against the ball 16 to resist rotation of the ball 16 within the socket assembly 22.

In use, the mount 12 is installed in a vehicle by selecting a suitably smooth and flat surface. Such a surface may be on a windshield, other window, or dashboard. Alternatively, a specially made material may be attached to a surface of the vehicle to provide a superior mounting surface for the suction cup mount. The mount 12 is pressed onto the surface and the lever 26 is flipped downward to secure the mount 12 to the surface via the vacuum grip function. Once the mount 12 is secured to the surface, the electronic device 20 may be easily snapped onto and off of the mount 12.

To secure the electronic device 20 to the mount 12, the user simply places the orifice 32 of the socket assembly 22 over the ball 16 and pushes the socket assembly 22 onto the ball 16. The electronic device 20 may then be repositioned as the user desires and the arms 40,42,44 will cause the electronic device 20 to remain in its current position. To remove the electronic device 20 from the mount 12, the electronic device 20 is rotated to an extreme angle relative to the mount 12, such as to the user's left or right, and then pushed beyond the angle to cause the socket assembly 22 to snap off of the ball 16. Alternatively, the electronic device 20 can be pulled straight out to cause the socket assembly to snap off the ball, but this requires more pulling force. The mount 12 is removed from the vehicle's surface by lifting the lever 26 away from the base 14 of the mount 12 to release the suction cup and the tab is pulled away from the vehicle surface.

In another embodiment shown in FIGS. 7-11, the present invention provides a mounting assembly 100 operable to couple an electronic device D to a surface S, such as a windshield. The mounting assembly 100 broadly includes a base 102 operable to removably couple with the surface S and a socket assembly 104 operable to removably couple with both the electronic device D and the base 102. Such a configuration enables the electronic device D to be easily positioned in confined environments by first attaching the base 102 to the surface S, then attaching the socket assembly 104 to the base 102 and positioning the socket assembly 104 in a desired orientation, and finally attaching the electronic device D to the socket assembly 104.

Figure 8:
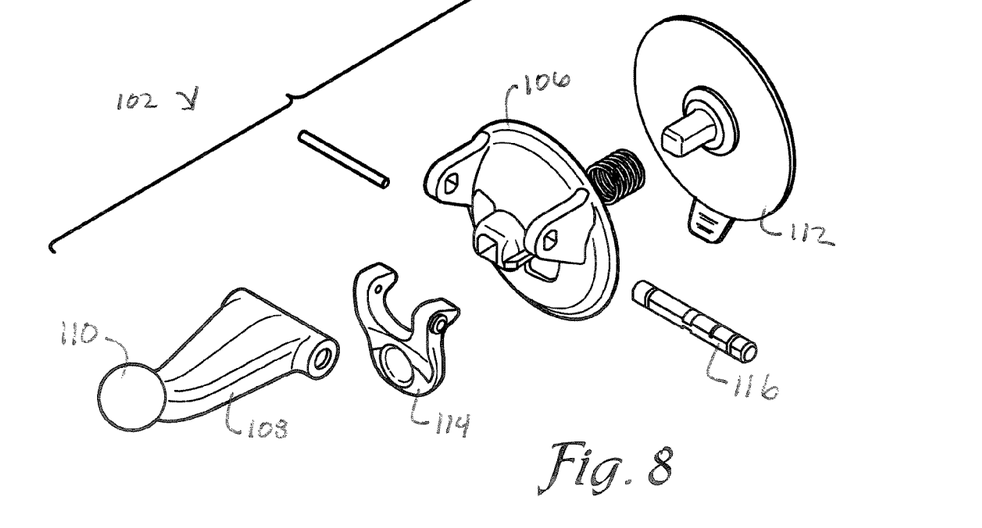
FIG. 8 is an exploded view of a mounting base configured in accordance with various embodiments of the present invention.

The base 102 preferably includes a circular platform 106 operable to removably mount to the surface S, an arm 108 extending from the platform 106, and a mounting ball 110 positioned on a distal end of the arm 108. The circular platform 106 may removably mount to the surface S utilizing various methods and devices, such as by utilizing mating components, adhesive elements, hook and loop fasteners such as VELCRO, latches, etc. Preferably, the circular platform 106 removably mounts to the surface S utilizing suction. For instance, the circular platform 106 may include a flexible sheet 112 for creating a vacuum-seal with the surface S in a substantially similar manner to that discussed above regarding the flexible sheet 24.

The circular platform 106 may additionally include a lever 114 coupled with the flexible sheet 112 to engage the sheet to facilitate suction mounting of the base 102 to the surface S. The flexible sheet 112 may also include a tab to facilitate removal of the base 102 from the surface S by breaking the vacuum seal between the flexible sheet 112 and the surface S. The lever 114 and the tab are substantially similar to the lever 26 and tab 28 discussed above.

The arm 108 extends from the platform 106 to facilitate coupling with the socket assembly 104. Preferably, the arm 108 is rotatably coupled with the platform 106 to enable the arm 108 to rotate with respect to the base 102. The arm 108 may be rotatably coupled with the circular platform 106, or other portions of the base 102, utilizing various devices and methods, such as hinges, pivoting elements, flexible elements, etc. For instance, the circular platform 106 may include a raised axle 116 around which the arm 108 is operable to pivot.

The rotatable coupling of the arm 108 and the platform 106 preferably enables the arm 108 to be rotated by a user when force is applied but resists rotation of the arm 108 relative to the base 102 in the absence of user applied force. Thus, friction is preferably provided between the arm 108 and the circular platform 106, such as by having the axle 116 fit snugly through the arm 108 or by utilizing a hinge having resistive properties, to prevent inadvertent movement of the arm 108.

The ball 110 is positioned at the distal end of the arm 108 opposite the circular platform 106. The ball 110 may be integral with the arm 108 to facilitate formation of the arm 108 or the ball 110 may be removable from the arm 108, such as where a plurality of balls are provided to conform to various socket assemblies. The ball 110 is substantially similar to the ball 16 discussed above. Thus, the ball 110 is substantially rigid to prevent deformation thereof and presents an outer surface that introduces sufficient friction between the ball 110 and the socket assembly 104 to resist movement of the electronic device D relative to the base 102. The ball 110 may be constructed of plastic or another sturdy material that presents a rough surface, or may be coated to present a rough or soft surface with the friction characteristics described above.

Figure 7:
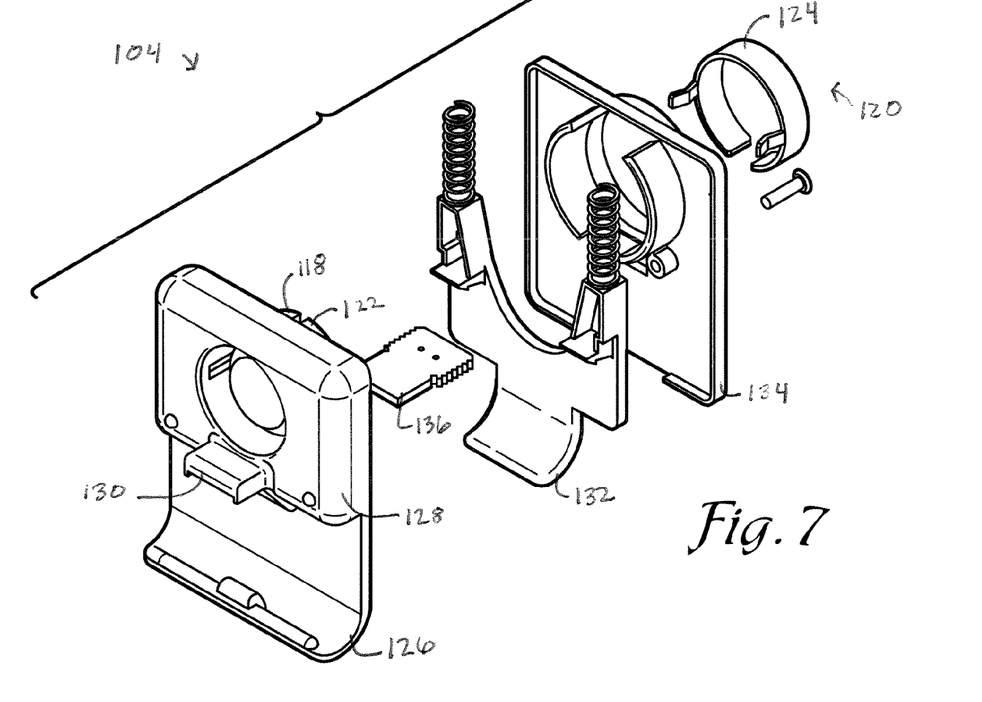
FIG. 7 is an exploded view of a socket assembly configured in accordance with various embodiments of the present invention.

The socket assembly 104 removably couples with both the base 102 and the electronic device D. Preferably, the socket assembly 104 removably couples with the base 102 by receiving and frictionally engaging at least a portion of the ball 110. In various embodiments the socket assembly 104 includes a seat 118 positioned at least partially within an orifice 120 operable to receive at least a portion of the ball 110. The seat 118 and the orifice 120 are substantially similar to the seat 34 and the orifice 32 discussed above, with an exception being the seat 118 and orifice 120 are positioned on an assembly removable from an electronic device.

In a similar manner to the seat 34, the seat 118 may include a plurality of interconnected arms 122 substantially similar to the arms 40,42,44, discussed above. The arms 122 preferably substantially conform to the outer surface of the ball 110 to enable receipt of the ball 110, to removably and rotatably couple the socket assembly 104 to the base 102, and to frictionally resist rotation of the ball 110 relative to the seat 34.

The socket assembly 104 may additionally include a spring element 124 operable to facilitate coupling of the ball 110 and the seat 118. The spring element 124 is substantially similar to the spring element 36 discussed above and functions in a substantially similar manner. Thus, the arms 122 and the spring element 124 cooperate to frictionally resist rotation of the ball 110 within the socket assembly 104 and to retain the ball 110 in the socket assembly 104.

Figure 9:
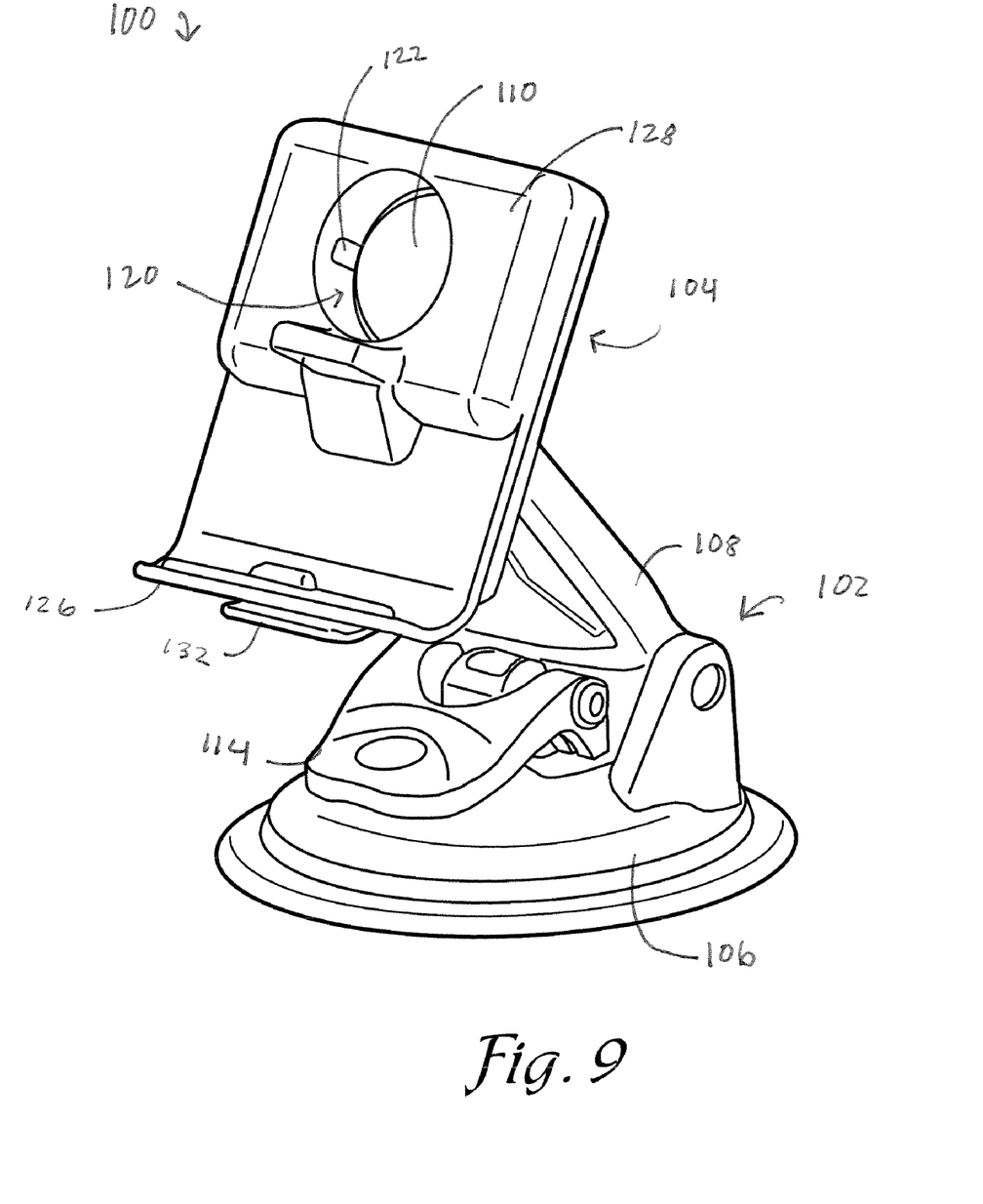
FIG. 9 is a front perspective view of a mounting assembly including the socket assembly of FIG. 7 coupled with the base of FIG. 8.

The socket assembly 104 may removably couple with the electronic deice D utilizing any coupling element, fastener, or other removable securing element. Preferably, the socket assembly 104 includes an arcuate clip 126 operable to removably couple with the electronic device D. The arcuate clip 126 includes a generally rounded portion to enable the electronic device D to receive or otherwise couple with a portion of the arcuate clip 126 and rest against a front 128 of the socket assembly 104.

Figure 11:
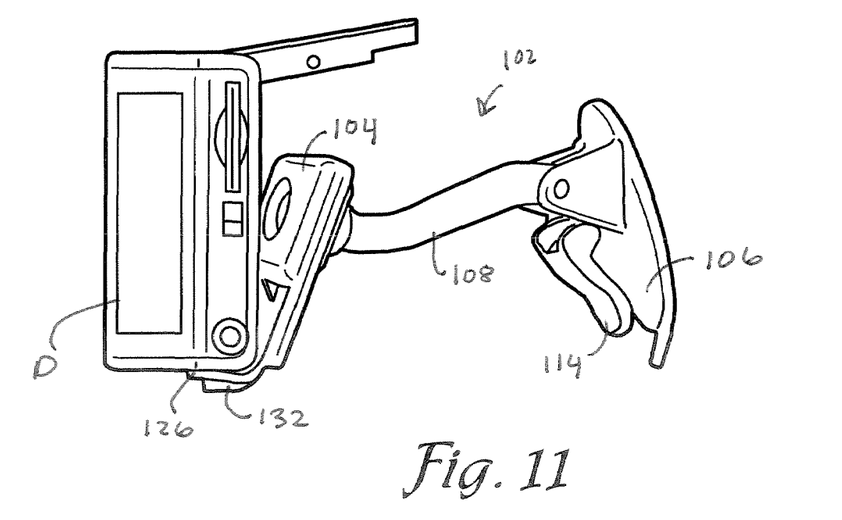
FIG. 11 is a side view of the mounting assembly of FIGS. 9 and 10 coupled with an electronic device.

Thus, the electronic device may be secured to the mounting assembly 100 by receiving a portion of the arcuate clip 126 and/or by resting on a portion of the arcuate clip 126. Utilization of the arcuate clip 126 additionally facilitates coupling of the electronic device D and the socket assembly 104 as the electronic device D may be quickly and easily positioned on the arcuate clip 126 due to its generally rounded profile.

The socket assembly 104 may additionally or alternatively include other coupling elements, such as a protrusion 130 that extends from the front 128 of the assembly 104 to removably couple or support the electronic device D. For example, the protrusion 130 may removably and securely attach the electronic device D to the assembly 104. In various embodiments, the combination of the arcuate clip 126 and the protrusion 130 more securely couples the electronic device D to the assembly 104 than utilization of either element by itself.

In various embodiments, the socket assembly 104 may also include a spring-biased retaining member 132. The retaining member 132 is preferably positioned between the front 128 of the assembly 104 and a rear 134 of the assembly 104. The retaining member 132 facilitates coupling of both the electronic device D and the base 102 to the assembly 104 by providing a biasing force. The retaining member 132 may include a locking element 136 operable to lock the retaining member 132 in a positioned when a predetermined amount of force is applied. The retaining member 132 preferably enables the electronic device D to be forcefully coupled with the socket assembly 104 without imparting undesirable force to the arm 108 or base 102 to inadvertently position the mounting assembly 100.

Figure 10:
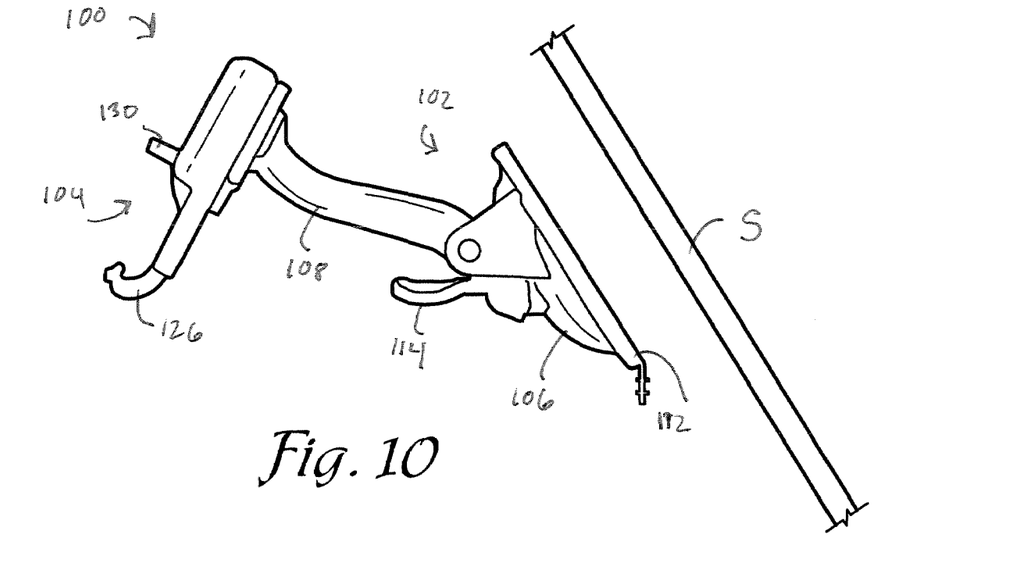
FIG. 10 is a side view of the mounting assembly of FIG. 9 coupled to a windshield.

In operation, the mounting assembly 100 is operable to be utilized in a generally similar manner to the mount 12 described above. However, the removable configuration of the socket assembly 104 additionally facilitates mounting of the assembly 100. Specifically, a user may individually couple the base 102 with the surface S, individually couple the socket assembly 104 to the base 102, and then couple the electronic device D to the socket assembly 104. Similarly, the socket assembly 104 may be detached from the electronic device D to quickly remove the electronic device D from the mounting assembly 100 without requiring removal of the ball 110 from the seat 118.

Although the invention has been described with reference to a particular embodiment illustrated in the attached drawings, it is noted that equivalents may be employed and substitutions made herein without departing from the scope of the invention as recited in the claims. It will be appreciated, for example, that the metal spring ring 40 may be replaced with a similar element capable of biasing the arms 40,42,44 against the ball 16 including, for example, a plastic spring ring or a rubber or elastomer ring that entirely encircles the arms 40,42,44. Furthermore, the arms 40,42,44 need not be plastic buy may be constructed of any flexible, friction-producing material and may be connected to an element of the housing 18 other than the center portion 38. Further yet, it will be appreciated that use of the ball and socket assembly disclosed herein is not restricted to portable electronic devices, but may also be used to removably retain other devices, such as, for example, mirrors.

Having thus described the preferred embodiment of the invention, what is claimed as new and desired to be protected by Letters Patent includes the following:

The invention claimed is:

1. A mounting assembly for mounting an electronic device to a surface, the mounting assembly comprising:
 a base including a platform having a suction device, an arm extending from the platform, a mounting ball positioned on an end of the arm distal from the platform, and a lever operable to bias the suction device for facilitating coupling of the platform to the surface; and a socket assembly for receiving and frictionally engaging the ball to removably couple the socket assembly to the base, the socket assembly including a clip having a substantially flat portion extending generally perpendicular to a longitudinal axis of the socket assembly;

wherein the socket assembly is operable to removably couple with the electronic device for mounting the electronic device to the surface and the substantially flat portion is operable to at least partially support a bottom portion of the electronic device.

2. The mounting assembly of claim 1, wherein the socket assembly is operable to rotate with respect to the base to position the electronic device when the socket assembly is removably coupled to the base.

3. The mounting assembly of claim 1, wherein the arm is operable to rotate with respect to the platform.

4. The mounting assembly of claim 1, wherein the socket assembly includes a seat formed of a flexible, friction-producing material for being biased against the ball to produce friction for preventing the socket assembly from moving relative to the base in the absence of a user-applied force.

5. The mounting assembly of claim 4, wherein the seat includes a plurality of arms for substantially surrounding the ball when the socket assembly is removably coupled to the base.

6. The mounting assembly of claim 5, wherein the arms are curved to substantially conform to an outer surface to the ball and to engage a hemisphere of the ball to retain the ball in the seat.

7. The mounting assembly of claim 5, wherein the arms frictionally engage the ball to produce friction between the arms and the ball for preventing the socket assembly from moving relative to the base in the absence of user-applied force.

8. The mounting assembly of claim 5, wherein the cage is smaller in diameter than the ball when the arms are in a relaxed state.

9. A mounting assembly for mounting an electronic device to a surface, the mounting assembly comprising:

a base including a circular platform having a suction device for coupling the platform to the surface, a lever coupled with the platform and operable to bias the suction device thereby facilitating coupling the platform to the surface, an arm extending from the platform and operable to rotate with respect to the platform, and a mounting ball positioned on an end of the arm distal from the platform; and a socket assembly including an arcuate clip operable for being removably coupled with the electronic device and a seat coupled with the clip, the clip having a substantially flat portion extending generally perpendicular to a longitudinal axis of the socket assembly, the seat having a plurality of curved and interconnected arms for contacting an outer surface of the ball so that the arms substantially conform to the outer surface of the ball when the mounting ball is received in the arms for removably and rotatably coupling the socket assembly to the base and for frictionally resisting rotation of the ball relative to the seat.

10. The mounting assembly of claim 9, wherein the socket assembly further includes a spring element, the spring element for substantially encircling the curved arms, allowing the curved arms to flex outward to receive the ball, and biasing the curved arms inwardly to contact the ball when the ball is seated within the seat.

11. The mounting assembly of claim 10, wherein the spring element comprises a spring ring.

12. The mounting assembly of claim 9, wherein the curved arms are flexible and form a cage smaller in diameter than the ball when the curved arms are in a relaxed state.

13. The mounting assembly of claim 9, wherein the arms are operable to frictionally engage the ball for preventing the socket assembly from moving relative to the base in the absence of user-applied force.

* * * * *